United States Patent [19]

Pett

[11] 4,319,997
[45] Mar. 16, 1982

[54] MULTIPLE FILTER CASE

[75] Inventor: Manfred Pett, Gleichen-Bremke, Fed. Rep. of Germany

[73] Assignee: Sartorius GmbH, Fed. Rep. of Germany

[21] Appl. No.: 158,791

[22] Filed: Jun. 12, 1980

[30] Foreign Application Priority Data

Jun. 15, 1979 [DE] Fed. Rep. of Germany ... 7917272[U]

[51] Int. Cl.$^3$ .............................................. B01D 27/00
[52] U.S. Cl. ....................................... 210/85; 210/248; 210/323.2; 210/443; 210/450
[58] Field of Search ..................... 210/323.2, 339, 340, 210/341, 346, 347, 435, 443–445, 450, 453, 474, 85, 93, 248

[56] References Cited

U.S. PATENT DOCUMENTS

| | | | |
|---|---|---|---|
| 1,919,570 | 7/1933 | Pickard | 210/323.2 |
| 2,440,487 | 4/1948 | Rayburn | 210/323.2 |
| 3,298,522 | 1/1967 | Muller | 210/DIG. 10 |
| 4,248,714 | 2/1981 | Acosta | 210/323.2 |

Primary Examiner—Peter A. Hruskoci
Attorney, Agent, or Firm—Eric P. Schellin

[57] ABSTRACT

A multipart filter case for holding at least one cartridge-shaped filter element, particularly for the sterile filtration of fluids, has a bell-shaped case with a top part into which the filter inlet side protrudes. The filter outlet side is held downstream in an intermediate plate and ends in a filtrate space below the intermediate plate. The filtrate space is defined in part by a dish-shaped base plate parallel to the intermediate plate, and has a filtrate outlet therein. The inlet for the medium to be filtered extends through the base plate and intermediate plate into the top part of the case, and comprises a tubular part integral with the intermediate plate and which detachably penetrates the base plate.

5 Claims, 2 Drawing Figures

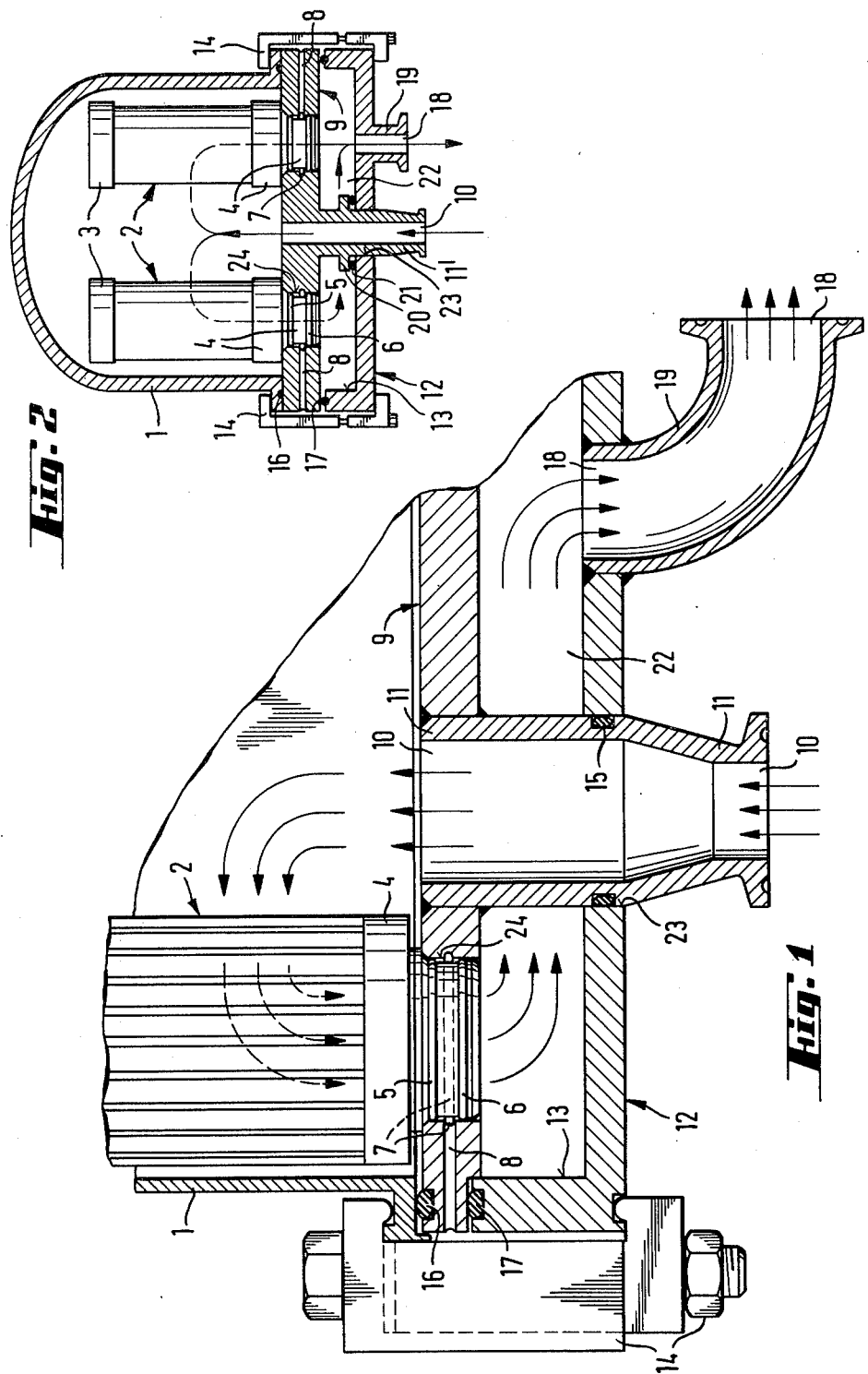

MULTIPLE FILTER CASE

BACKGROUND OF THE INVENTION

1. Field of the Invention

This invention relates to filters for sterile filtration of fluids, and more particularly, to a filter case construction for such filters in which means is provided to prevent leakage of medium to be filtered from an inlet into the filtrate chamber. In copending application Ser. No. 158,790, filed concurrently herewith, leak detecting means is disclosed for detecting leakage of non-filtered medium.

2. Prior Art

U.S. Pat. No. 3,298,522 is made of record.

In a known filter case the inlet connection piece for the medium to be filtered is undetachably connected with the base plate; it penetrates the intermediate plate, and ends in the top part of the case. The filtrate space below the intermediate plate is sealed off against the top part of the case in the area of the connection piece by at least one O-ring packing, arranged on the inside of the perforation in the intermediate plate or on the outside of the tubular inlet connection piece. At filtration under high pressure, the packings of replaceable structural elements or of the filter cartridges sometimes become loose. This is partly caused by damage to the packing rings, and partly by a canting of the structural elements. In the known case, unfiltered medium flows or leaks from the top portion of the case along the packing and the outer edge of the inlet connection piece into the filtrate space, the leaky spot remaining undeterminable. In sterile filtration, a non-sterile medium thus enters the sterile space, whereby the whole filtrate becomes non-sterile.

SUMMARY OF THE INVENTION

The principal object of the invention is therefore to improve with simple means a filter case of the type discussed above in such a way that occurring leaky spots and leakage losses are easily determinable and filtrate already sterile does not become non-sterile by contact with leakage losses.

This is achieved according to the invention in that the inlet for the medium to be filtered is a tubular connection piece formed as an integral part of the intermediate plate and undetachably connected therewith, and that the connection piece detachably perforates the base plate, with the inclusion of a packing.

In one development of the invention, the connection piece is sealed in the perforation of the base plate by an O-ring packing. In another embodiment, the connection piece is provided with a flange which adapts itself to the edge of the perforation of the base plate with a packing.

Due to the arrangement of the perforation in the base plate and the absolutely tight structure of the intermediate plate and connection piece, no unfiltered medium can penetrate from the top part into the sterile space. Should, however, the packing between the connection piece and the base plate become loose, no harm is done since the liquid pressure in the sterile space is, on the one hand, not so high that larger amounts of leakage pass through the packing, but is on the other hand, high enough to prevent a secondary contamination from the outside into the sterile space. Besides, the leaky spot is sufficiently recognizable so that correction can be made.

BRIEF DESCRIPTION OF THE DRAWINGS

FIG. 1 is a greatly enlarged fragmentary vertical section through a relevant portion of the case; and FIG. 2 is a vertical section showing a modification of the case of the invention.

DETAILED DESCRIPTION OF THE INVENTION

The multipart case consists essentially of a bell-shaped case top part 1, an intermediate plate 9, and a dish-shaped base plate 12, which parts are sealably connected on their periphery with the inclusion of packings 16, 17 by clamping means 14.

Intermediate plate 9 is provided with a tubular connection piece 11 welded to the plate, in each case durably connected therewith in a tight manner and which forms an inlet 10 which passes upward through the base late 12 and ends in case top part 1.

Base plate 12 is dish-shaped and an associated collar 13 may also be molded thereon, extending toward intermediate plate 9 so as to form a filtrate space 22. In sterile filtration, this space assumes the function of the sterile space, and is provided with an outlet connection piece 19.

The outside of connection piece 11 is provided, in the area of a perforation 23 of the base plate with an O-ring packing 15 and serves, besides, as a visible leakage control station.

In the embodiment of Fig. 2, a flange 20 is provided on the outer surface of connection piece 11', which flange 20 adapts itself with a packing 21 to the upper edge of base plate 12 in the area of perforation 23 and is likewise subject to clamping means 14. Filtrate can therefore, if at all, pass at this spot from filtrate space 22 without the danger of a secondary contamination for the sterile filtrate.

The cartridge-shaped filter element 2 proper protrudes with its closed end capt 5 into the case top part, and with its end cap 4 into a perforation of intermediate plate 9 and is provided, in this area, with at least two ring packings 5 and 6 which are fixed, with an axial space between them, to the outside of the end cap 4 and thus seal the bell-shaped space of the case top part 1 against filtrate space 22.

Usually several of such filter elements 2 are distributed over the periphery of intermediate plate 9, whereby the danger of leaky spots at the end caps 4 increases. In order to prevent an uncontrolled penetration of medium to be filtered along the two ring packings 5 and 6 into filtrate space 22, especially in sterile filtration, at least one leakage control channel 8 is attached in the area between the two ring packings 5 and 6, which channel 8 ends on the case outside of intermediate plate 9 and can therefore be inspected. Preferably, in the free space between the two ring packings 5 and 6, a ring channel 7 is inserted either in the end cap 4 or, as shown, in the wall of the perforation of intermediate plate 9, in which ring channel 7 leakage channel 8 ends.

If, in fact, due to damaged packing 5 or canting of filter element 2, a leakage of the medium from case top part 1 in the direction toward filtrate space 22 occurs, the medium, usually liquid, is discharged from ring channel 7 through leakage control channel 8 toward outside of the casing.

Due to the pressure drop in ring channel 7, the medium can also no longer overcome packing 6 to sterile space 22, so that the filtrate does not become non-sterile space 22, so that the filtrate does not become non-sterile again. The medium to be filtered is therefore only capable of flowing as it is supposed to, i.e. through the filter layers of filter element 2 into filtrate space 22.

When more than two ring packings 5, 6, e.g., three, are provided on the end cap 4, the leakage control channel is suitably arranged in a downstream direction between the last two ring packings.

The special advantage of leakage control channel 8 becomes apparent when a multiplicity of such filter elements are arranged on the periphery of intermediate plate 9 and when by means of the leakage control channel associated with each filter element 2 it can be unambiguously determined which filter element 2 located in intermediate plate 9 has become untight, so that suitable measures can be initiated.

What we claim as new and desire to secure by U.S. Letters Patent is:

1. A multipart filter case for holding at least one cartridge-shaped filter element, particularly for the sterile filtration of fluids, comprising:

a bell-shaped case top part;

an intermediate plate having at least one perforation and at least one cartridge-shaped filter element attached thereto said filter element having an end cap thereof sealed in said perforation;

a dish-shaped base plate arranged parallel to the intermediate plate and provided with a filtrate outlet and defining with the intermediate plate a filtrate space;

a leakage control channel connecting the area between at least two ring packings with the outside of the case, the ring packings arranged longitudinally, spaced on the cap against the top part, the intermediate plate being sealed off in the top part by the ring packings a filter inlet for the medium to be filtered protruding through the base plate and the intermediate plate into the case top part and comprising a tubular connection integral with the intermediate plate and extending detachably and sealably through the base plate; and clamping means for fluidtight connections of the top part, the intermediate plate, and the dish-shaped plate at their peripheries with the packings.

2. A filter case as in claim 1, wherein:

said tubular connection is sealed in a perforation of the base plate by means of an O-ring packing.

3. A filter case as in claim 1, wherein:

said tubular connection is provided with a flange which engages against the base plate around the perforation; and is sealed thereto with a packing.

4. A filter case as in claim 1 or 2 or 3, wherein:

said tubular connection is welded to the intermediate plate.

5. A filter case as in claim 1 or 2 or 3, wherein:

said tubular connection piece is integrally molded with the intermediate plate.

* * * * *